(12) United States Patent
Rihn

(10) Patent No.: US 10,556,175 B2
(45) Date of Patent: Feb. 11, 2020

(54) RENDERING A HAPTIC EFFECT WITH INTRA-DEVICE MIXING

(71) Applicant: Immersion Corporation, San Jose, CA (US)

(72) Inventor: William S. Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 259 days.

(21) Appl. No.: 15/617,429

(22) Filed: Jun. 8, 2017

(65) Prior Publication Data

US 2017/0354876 A1 Dec. 14, 2017

Related U.S. Application Data

(60) Provisional application No. 62/348,730, filed on Jun. 10, 2016.

(51) Int. Cl.
*A63F 13/285* (2014.01)
*G06F 3/01* (2006.01)
*A63F 13/24* (2014.01)
*G06F 3/0338* (2013.01)

(52) U.S. Cl.
CPC ............ *A63F 13/285* (2014.09); *A63F 13/24* (2014.09); *G06F 3/016* (2013.01); *G06F 3/0338* (2013.01); *G06F 2203/013* (2013.01)

(58) Field of Classification Search
None
See application file for complete search history.

(56) References Cited

U.S. PATENT DOCUMENTS

| | | |
|---|---|---|
| 8,766,784 B2 | 7/2014 | Radivojevic et al. |
| 9,174,134 B1 | 11/2015 | Grant et al. |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2004/0056840 A1* | 3/2004 | Goldenberg ............ A63F 13/06 345/156 |
| 2013/0194085 A1* | 8/2013 | Grant ...................... G06F 3/016 340/407.2 |
| 2015/0130706 A1 | 5/2015 | Lacroix et al. |
| 2016/0019762 A1 | 1/2016 | Levesque et al. |
| 2016/0070348 A1 | 3/2016 | Cowley et al. |
| 2016/0084605 A1 | 3/2016 | Monti |

(Continued)

FOREIGN PATENT DOCUMENTS

| | | |
|---|---|---|
| EP | 2778852 A2 | 9/2014 |
| EP | 3020457 A1 | 5/2016 |
| WO | 2015004261 A2 | 1/2015 |

*Primary Examiner* — Thomas S McCormack
(74) *Attorney, Agent, or Firm* — Nath, Goldberg & Meyer

(57) ABSTRACT

Rendering haptic effects on at least one of a first haptic actuator or a second haptic actuator based on a state of a trigger. In response, the haptic effects are optimized to reflect game play.

20 Claims, 9 Drawing Sheets

(56) References Cited

U.S. PATENT DOCUMENTS

| | | |
|---|---|---|
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

\* cited by examiner

300

Localized Region

300

400

400

RENDERING A HAPTIC EFFECT WITH INTRA-DEVICE MIXING

PRIORITY APPLICATION

This application is a non-provisional application that claims the benefit of U.S. provisional Application No. 62/348,730, filed on Jun. 10, 2016, the contents of which are herein incorporated by reference in their entirety.

FIELD

Example embodiments are directed to rendering haptic effects, and more particularly, to rendering haptic effects on multiple haptic output devices.

BACKGROUND

Gaming peripheral devices or other haptically-enabled devices can include triggers used to control events that occur during game play. Conventionally, haptic effects on the triggers cannot be felt at all (e.g., when the device does not include the necessary hardware/software to render the haptic effects), or in certain situations (e.g., when an individual is not touching the triggers, or when an individual grounds the triggers by extending the triggers to a physical limit of the trigger's range of movement).

SUMMARY

One embodiment renders haptics by determining a state of a trigger associated with a first haptic actuator of a haptically-enabled device during a haptic event, and rendering haptic effects on at least one of the first haptic actuator or a second haptic actuator based on the state of the trigger. The second haptic actuator is in a body of the haptically-enabled device.

BRIEF DESCRIPTION OF THE DRAWINGS

Example embodiments will be more clearly understood from the following detailed description taken in conjunction with the accompanying drawings.

FIGS. 1A, 1B and 1C are top, bottom and partial views of a haptically-enabled game controller according to an example embodiment.

FIG. 2 is a partial view of a haptically-enabled game controller according to another example embodiment.

FIGS. 3A and 3B are additional top and bottom views of isolated regions on a haptically-enabled device according to an example embodiment.

FIG. 4A is perspective view of isolated track pads on a haptically-enabled device according to an example embodiment.

FIG. 4B is a diagram of alternative configurations of isolated track pad surfaces for use with haptic output device according to an example embodiment.

FIGS. 5 and 6 are flow charts of haptic rendering according to example embodiments.

FIG. 7 is a block diagram of a system in a haptically-enabled device according to an example embodiment.

DETAILED DESCRIPTION

Figure 1A:
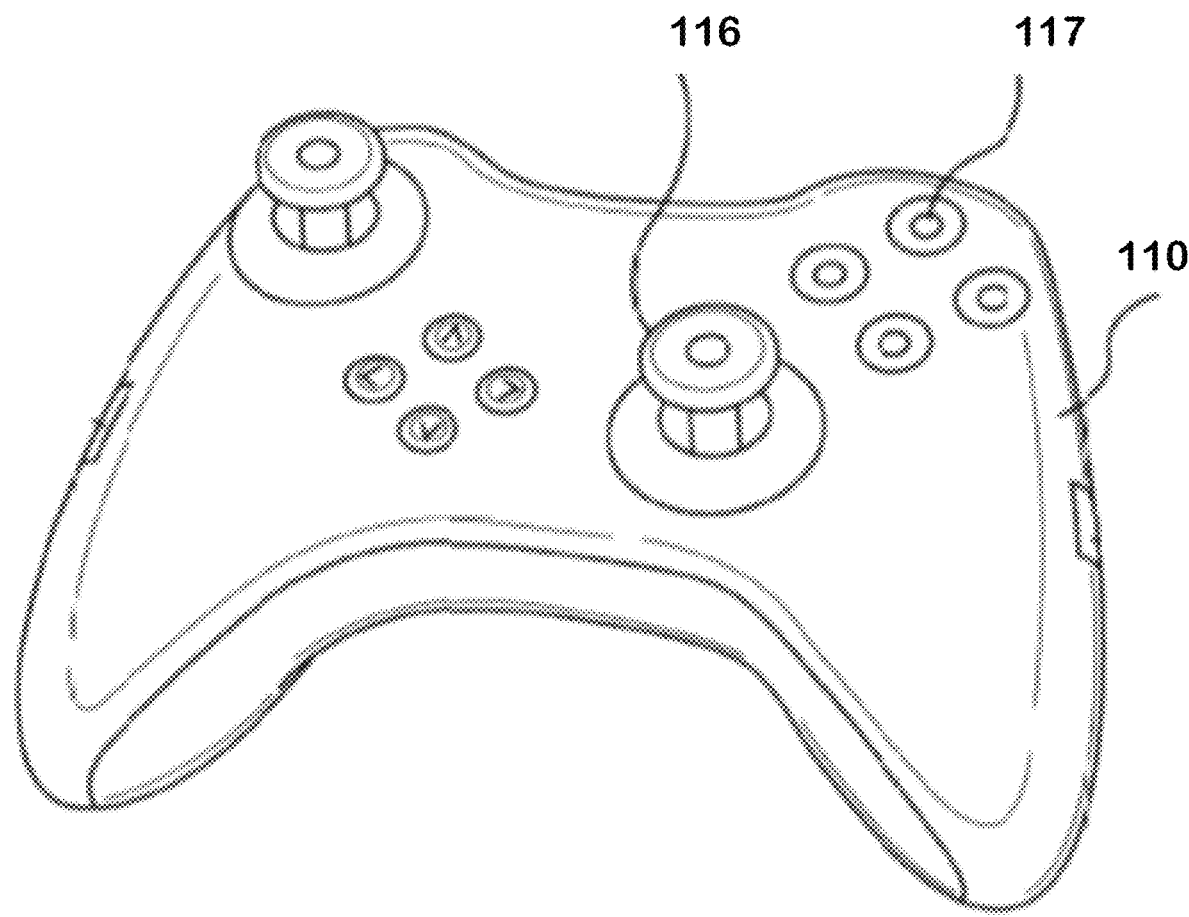
FIGS. 1A, 1B, 1C, 2, 3A, 3B, 4A, 4B and 5-7 represent non-limiting, example embodiments as described herein.

Example embodiments are directed to rendering haptic effects on multiple haptic output devices.

Example embodiments are directed to rendering haptic effects on multiple haptic output devices to optimize the haptic effects to reflect the game play, thereby providing a more immersive experience.

Haptics is a tactile and force feedback technology that generates haptic feedback effects (also known as "haptic feedback" or "haptic effects"), such as forces, vibrations, and motions, for an individual using the individual's sense of touch. Haptic output devices can include embedded hardware (e.g., body actuators, triggers with actuators, or other output/input mechanisms) configured to generate the haptic effects. The embedded hardware is, generally, programmed to render (or playback) a particular set of haptic effects. When a signal specifying which haptic effect to play is received by a haptically-enabled device, the haptic output device of the haptically-enabled device renders the specified haptic effect. For example, when an individual experiences a haptic event during game play, one or more triggers of a gaming peripheral device receives a play command through control circuitry. The triggers then render the appropriate haptic effect through an actuator providing vibrotactile and/or kinesthetic haptic effects.

In an example embodiment, other mechanisms using actuated input from an individual may be used, aside from trigger actuators.

The triggers can include haptic features to further enhance the haptic effects such as the triggers disclosed in U.S. Patent Publication No. 2015/0130706 directed to a haptic trigger control system, and U.S. Pat. No. 9,174,134 directed to peripheral devices with a haptic diminishment prevention component.

According to example embodiments, one way to enhance the feeling of the haptic effects by the individual is to change the structure of the trigger by, for example, extending the range of motion of the trigger in order to allow the trigger to extend past an outward resting position and/or to recede into the body or shell of the haptic output device past an inward resting position. By allowing the trigger to extend past the resting positions, the trigger can render haptic effects at four limits, as opposed to only two. However, this feature generally only allows for an enhanced haptic and immersive experience when the individual is holding the haptic output device in an ideal manner.

According to example embodiments, an intra-device mixer within an haptically-enabled device is used that sub-operatively distributes (or, moves) the rendering of the haptic effects on another actuator (e.g., in a body or housing of the haptically-enabled device) in addition to an intended actuator (e.g., a trigger actuator), when the intended actuator is not in contact with an individual's finger in an ideal manner to render the haptic effects as intended. Movement of the rendering of the haptic effects can involve slight modulation. Movement of the rendering of the haptic effects may involve rendering the haptic effects on both actuators simultaneously. The haptically-enabled device can selectively move the rendering of the haptic effects.

Moving the rendering of the haptic effects to an actuator other than the intended actuator is accomplished by using a software and/or firmware component of the intra-device mixer in combination with the technical features of the haptically-enabled device (e.g., the form of the body, the map, etc.) and/or actuators (e.g., power, power output, etc.) to apply an appropriate algorithm. The intra-device mixer can include a hardware component, in addition to software (or firmware) component.

The rendering of the haptic effects are moved to the actuator other than the intended actuator by programmatically altering a channel of the haptically-enabled device by which the corresponding haptic signal is transmitted, or by programmatically altering source content. Profiles can be setup for each potential endpoint (e.g., actuator). The profiles encapsulate the capabilities of the endpoints. The profiles also contain algorithms for the modulation of a haptic effect from a source profile to an endpoint. For example, triggers may contain bidirectional haptic effects, which may not appropriately be rendered on an eccentric rotating mass motor ("ERM") or a linear resonant actuator ("LRA"). In this case, one of the directional haptic effects may be muted, thereby effectively rendering only half the bidirectional haptic effects.

Changing uni-directional effects (e.g., a sequence of all "pull" followed by a sequence of all "push") can be differentiated by rendering "push" and "pull" as different frequencies or strengths (or magnitude) on non-directional actuators. If an actuator is known to be slower than the source, a 10 ms maximum strength haptic effect for a LRA can be adjusted to a 80 ms haptic effect for an ERM, for example.

In an example embodiment, frequency data can be removed, for example, from a heavy-duty actuator for rendering on a LRA and an ERM, as opposed to adjusting the strength. Frequency data can also be added to keep a non-multi frequency haptic effect interesting, and/or a strength or frequency curve can be used to render a frequency based on a desired strength level.

Actuators are an example of a haptic output device used to output various forms of haptic effects (e.g., vibrotactile haptic effects, electrostatic friction haptic effects, deformation haptic effects, ultrasonic haptic effects, etc.) in response to a drive signal. Haptic output devices can include electrodes using electrical currents, a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device, or a device that provides projected haptic output such as a puff of air using an air jet, a laser-based projectile, a sound-based projectile, etc.

An actuator located in the body (i.e., other than on the trigger) of a haptically-enabled device (e.g., a game controller) can be an ERM. Alternatively, a fast response time actuator, such as a voice coil, a LRA or a solenoid, can be used to provide a more enhanced and immersive experience. However, example embodiments are not limited thereto. For instance, the actuator can be a piezoelectric actuator (ceramic actuators or macro-fiber composite ("MFC") actuators), an electroactive polymer ("EAP") actuators, an electric motor, an electro-magnetic actuator, a shape memory alloy, or a high bandwidth actuator can be used.

Example embodiments allow for authoring to one actuator (e.g., the trigger actuator) while stripping out directionality data when moving the rendering of the haptic effects to another actuator (e.g., the body actuator).

Example embodiments enable the haptics, to be rendered on a different actuator, to continue the haptic effects in a manner that allows the haptic effects reflecting the haptic event (e.g., game play) to be optimally experienced by the individual.

Example embodiments also seek to solve the problem of fatigue caused by rendering too many haptic effects on the individual's fingertips.

Figure 1B:
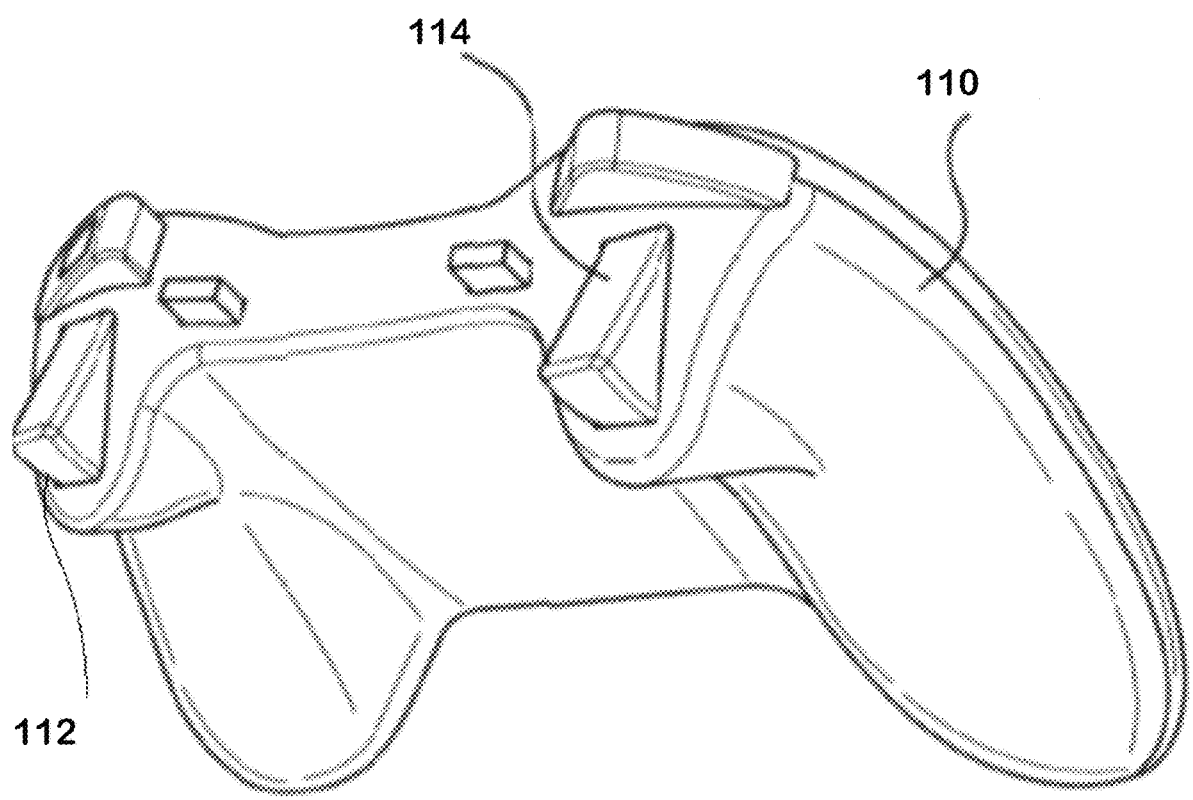
Figure 1C:
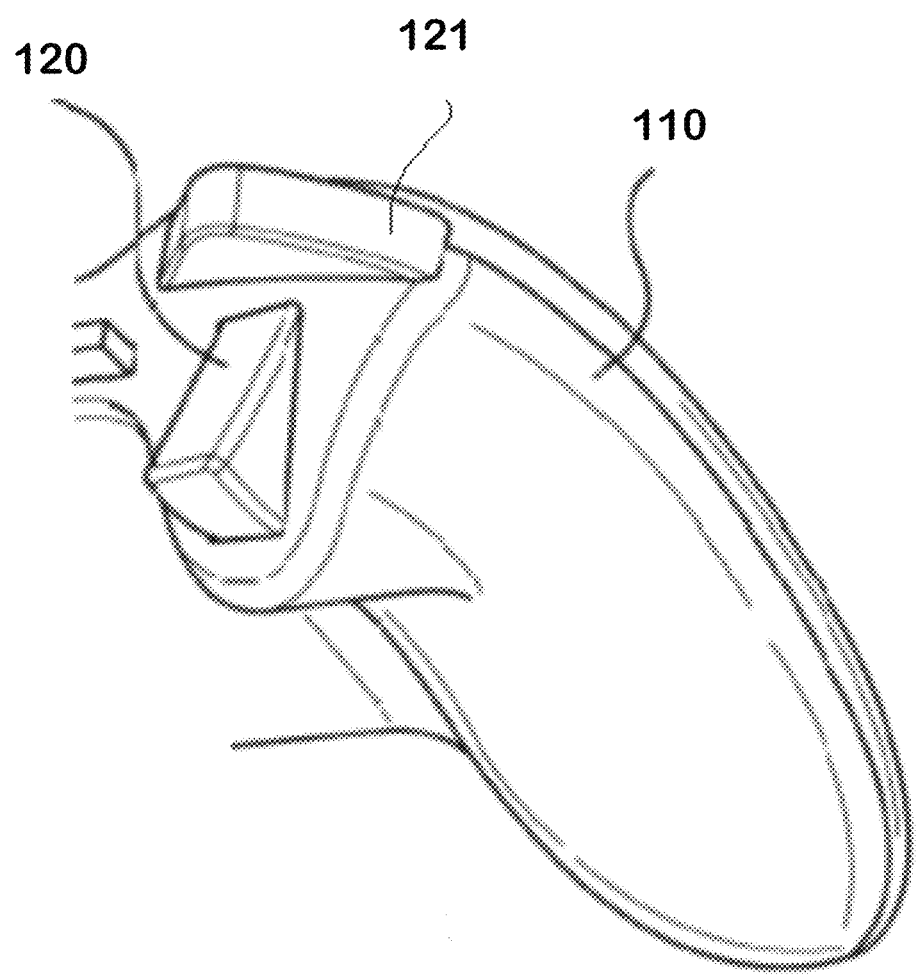
Figure 2:
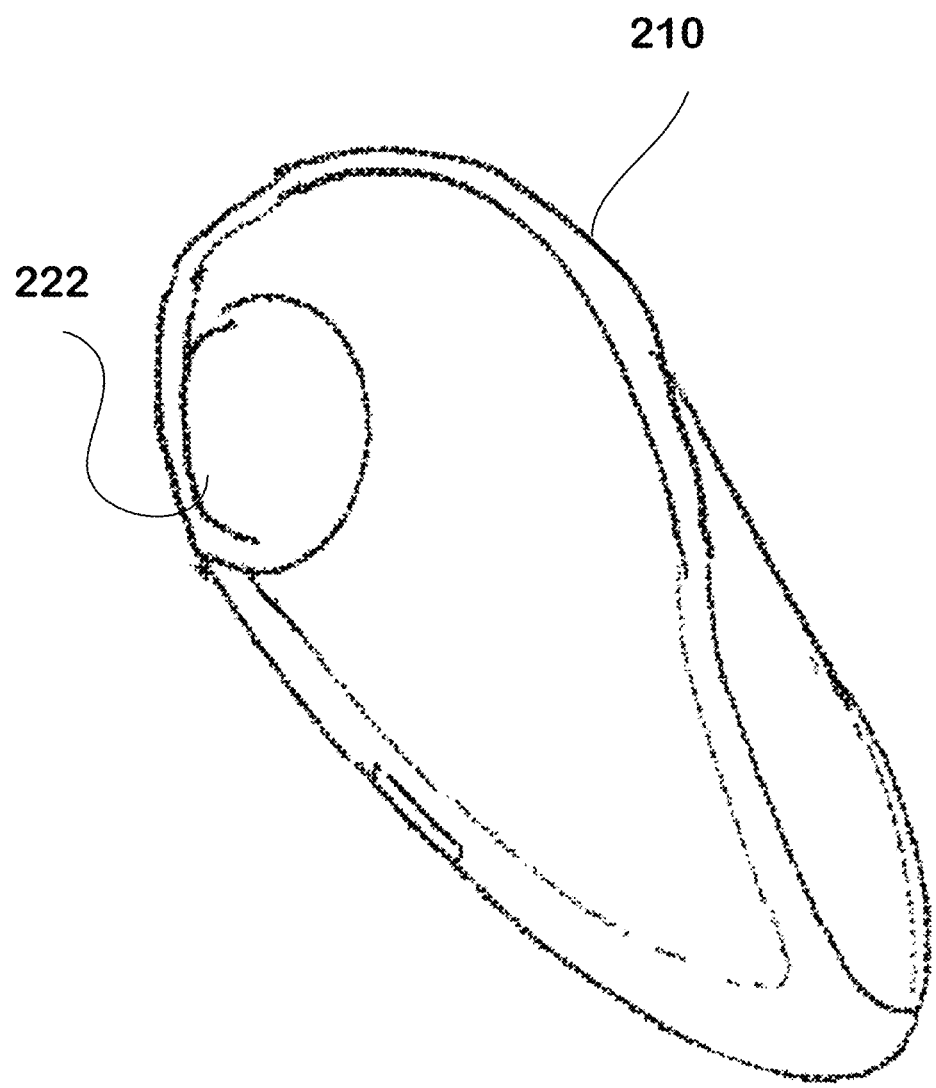

FIGS. 1A, 1B and 1C are top, bottom and partial views of a haptically-enabled game controller according to an example embodiment. FIG. 2 is a partial view of a haptically-enabled game controller according to another example embodiment.

Referring to FIGS. 1A and 1B, a haptically-enabled device 100 can include triggers 112 and 114 positioned on a backside of a body 110 of haptically-enabled device 100. Haptically-enabled device 100 may be a gaming peripheral device, a virtual-reality controller, a touch screen, or any user interface device. Analog or digital sticks 116 and/or buttons 117 can be positioned on a top side of body 110 of haptically-enabled device 100. However, example embodiments are not limited thereto. Haptically-enabled device 100 can include, for example, a rumble pad. As another example, haptically-enabled device 100 can include one than one trigger actuator. As shown in FIG. 1C, a horizontal trigger 120 and a vertical trigger 121 can be on haptically-enabled device 100. Alternatively, as shown in FIG. 2, a button 222 can be positioned on a bottom side of a body of a haptically-enabled device 200 according to an example embodiment.

Figure 3A:
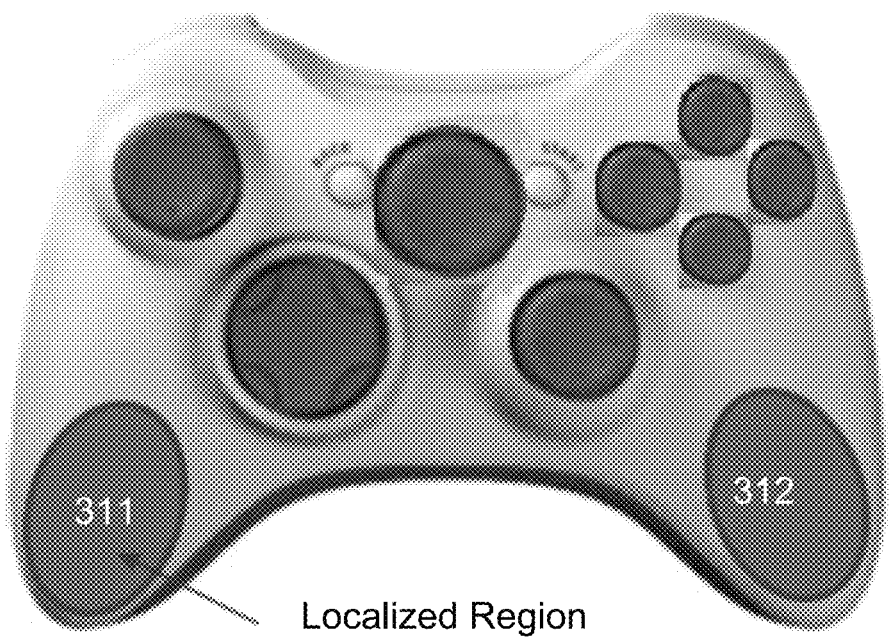
Figure 3B:

FIGS. 3A and 3B are top and bottom views of isolated regions on a haptically-enabled device according to an example embodiment.

Referring to FIGS. 3A and 3B, in addition to the body, analog or digital stick, button(s) described in connection with FIGS. 1A, 1B, 1C and 2, a haptically-enabled device 300 includes a plurality of isolated regions 311, 312, 313, 314, 315, and 316. Each of isolated regions 311-316 can each be configured to provide a discrete localized region for rendering the haptic effects.

By using discrete localized regions of haptically-enabled device 300 that can be individually manipulated to render the haptic effects, enhanced and full spatialization haptic effects can be provided. Haptically-enabled device 300 can produce spatialized haptic effects in which localized haptic feedback can be experienced by the individual. For example, an individual may perceive localized haptic effects that are provided at one or more isolated regions 311-316 of haptically-enabled device 300. Such localized haptic effects can be distinct from general haptic effects applied directly to the housing of haptically-enabled device 300. In another example, haptic effects can be applied to a subset of localized regions 311-316 to convey a sense of direction to an individual (e.g., left or right sensation).

In addition, haptic effects can be applied to a subset of isolated regions 311-316 by mapping what is occurring during game play to respective isolated regions 311-316 of haptically-enabled device 300. For example, if the body of an avatar is hit on the top left side, then haptically-enabled device 300 can have a corresponding haptic effect on the top left isolated region. In another example, an individual hit on the left side may feel haptic effects at the isolated regions on the left side, such as isolated regions 311, 314, and 316.

In example embodiments, isolated regions 311-316 can be mechanically arranged so that each portion of haptically-enabled device 300 can vibrate separately. Here, multiple or all of isolated regions 311-316 of haptically-enabled device 300 can be configured to apply the haptic effects, not just particular region(s). Isolated regions 311-316 also can be locked together such that a haptic effect can be applied to a subset of regions as one unit. In addition, the body of haptically-enabled device 300 can be molded with various materials of varying stiffness properties in order to isolate the vibration to each section. In an example embodiment, individual elements such as joysticks, buttons, rumble pads and the like can also be isolated from the different sections of the gamepad housing.

In example embodiments, haptically-enabled device 300 can be mechanically divided into isolated portions. For example, haptically-enabled device 300 can be divided into eight vibration isolated portions or octants. In this example, a haptic effect can be applied to an upper left octant and can be substantially isolated from the other octants. Here, isolated portions or octants can be interconnected by an active suspension having adjustable stiffness to interconnect the isolated portions. In other words, isolated sections can have variable dampening means between them in order to isolate haptic effects to particular portions(s) of haptically-enabled device 300. The stiffness can be increased in order to effectively couple two or more adjacent isolated portions of the haptically-enabled device into a single portion.

Figure 4A:

FIG. 4A is a perspective view of isolated track pads on a haptically-enabled device (e.g., a game controller) according to an example embodiment.

Referring to FIG. 4A, haptically-enabled device 400 can include isolated track pads 421, 422 as user input devices. Isolated track pads 421, 422 can also be used to render the haptic effects. The surface of each of track pads 421, 422 includes a deformable surface.

Figure 4B:
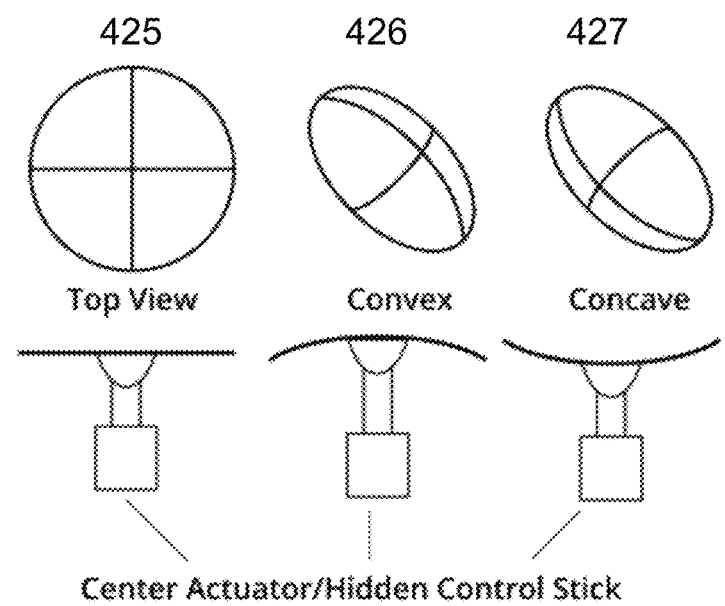

FIG. 4B is a diagram of alternative configurations of isolated track pad surfaces for use with a haptic output device according to an example embodiment.

Referring to FIG. 4B, the surface of isolated track pads shown in FIG. 4A can include a variety of structures, such as a planar surface structure 425, a convex surface structure 426, and a concave surface structure 427. In other example embodiments, the surface of isolated regions can be textured, and/or include curves, dimples, ridges, and the like.

Use of isolated track pads 421, 422 dynamically changes the feel and purpose of track pads, and allows the rendering of the haptic effects at areas where an individual is contacting the haptically-enabled device. In addition, use of isolated track pads 421, 422 enhances ergonomics and better enables pressure-sensitive applications.

The following scenarios are applications of the present invention in a game play setting to help demonstrate the example embodiments. However, example embodiments are not limited to gaming, and therefore, can be applied to other application as explained below in connection with FIG. 6.

Although the following scenarios are explained from the view of a single player, example embodiments are not limited thereto. For multiple players, haptic effects can be rendered on trigger(s), rumble pad(s) and/or body actuator(s) of the respective gaming peripheral device to reflect the game play of another player and/or themselves.

In a first scenario, an individual grounds a trigger actuator (or, reaches the physical limit of the trigger's range movement), while firing a weapon. When the trigger actuator is grounded, the haptic effects may not render as intended. Thus, to enhance the haptic experience, the haptic effects are rendered on a body actuator while the trigger actuator is grounded. The haptic effects can gradually be transitioned (or, fade) to the body actuator as the trigger actuator is released (or, pulled) from the grounded position.

In a second scenario, the individual actively contacts the trigger actuator but does not ground (or, reach the physical limit) of the trigger's range of movement. While the haptic effects are primarily rendered on the trigger actuator, the haptic effect can be gradually transitioned to the body actuator (and, if intended, again fully on the trigger actuator) to reflect what is occurring during game play.

In a third scenario, the trigger actuator is not depressed (or, not actively contacted) by the individual, but the individual's fingers are lightly and subtly resting on (or, passively contacting) the trigger actuator (e.g., during a reload sequence). When the individual passively contacts the trigger actuator, the haptic effects may not render as intended. In this context, the haptic effects can be rendered on only the trigger actuator, or on only the body actuator. Alternatively, the haptic effects can be rendered on both the trigger and body actuators since the individual's finger are resting on the trigger actuator, and the most realistic or immersive haptic experience would include rendering the haptic effects on the trigger in addition to the body of the gaming peripheral device. In an example embodiment, the strength of the haptic effects can be increased when the individual's fingers are passively (or, lightly) contacting the trigger actuator so that the vibration strongly emanates in the intended isolated region of the body.

In a fourth scenario, the individual's finger remains on (or, passively contacting) or near the trigger actuator, but the trigger actuator is not actively manipulated (or, contacted) by the individual. A capacitive sensor or other (e.g., pressure) sensor on the trigger actuator can determine if the individual's finger is on, or near, the trigger actuator even though the trigger actuator is not being manipulated by the individual in the game play. In another example embodiment, a strain gauge can be used to determine how hard or where (e.g., a center of a grip) an individual is gripping the haptically-enabled device and/or an actuator. In this context, the haptic effects are rendered on the body actuator rather than the trigger actuator, or alternatively the haptic effects can be rendered on both the trigger and body actuators because the most realistic or immersive haptic effect would include haptic effects on the trigger in addition to the body of the gaming peripheral device.

In a fifth scenario, the individual's finger is not on, or near, the trigger actuator. When the individual does not contact the trigger actuator, the rendering of the haptic effects will not be experienced the individual. In this context, the haptic effects are rendered on the body actuator to provide the optimal haptic effect given the game play.

In a sixth scenario, the individual's fingers are fatigued from extended game play. The individual's fatigue can be detected based on game play time, the number of times the trigger actuator has been used as input and/or the number of haptic effects that have been rendered on the trigger actuator. In this context, the haptic effects are rendered on the body actuator to prevent overstimulation of the individual's fingers during further game play.

According to an example embodiment, the individual may select an intensity level for the trigger actuator and/or the body actuator before or during game play, in any of the above scenarios, to provide the optimal haptic effect given the game play.

Figure 5:
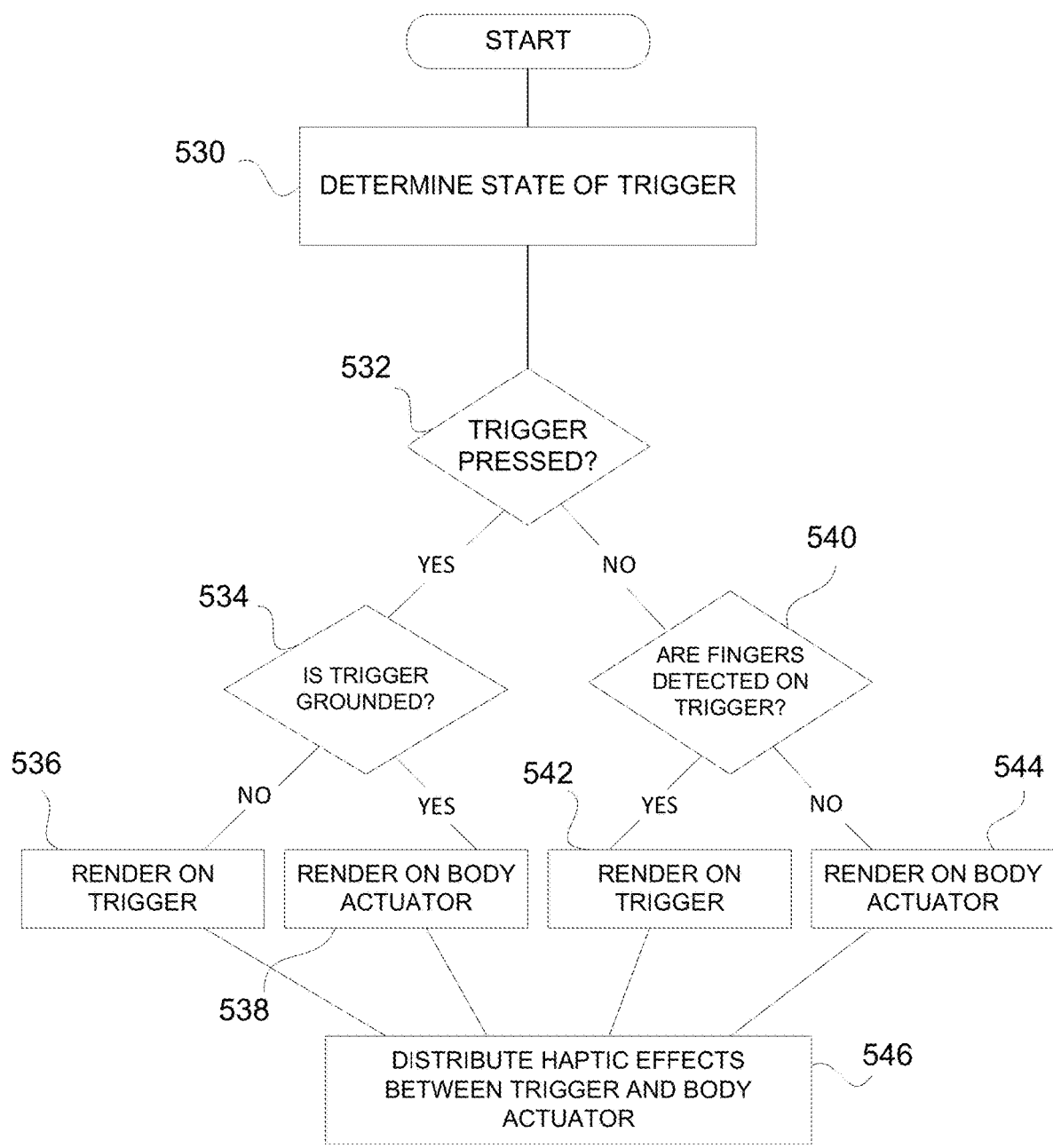

FIG. 5 is a flow chart of haptic rendering according to an example embodiment.

Referring to FIG. 5, haptic rendering 500 for a haptically-enabled device (e.g., a gaming controller) according to an example embodiment includes determining the state of a first haptic actuator (e.g., the trigger actuator) of the haptically-enabled device during a haptic event, at 530. The state of the trigger actuator can be determined repeatedly, and often. For instance, the state of the trigger actuator can be determined in response to each input by an individual.

Depending on the determined state of the trigger actuator, the functionality further includes determining whether or not the trigger actuator is pressed, at 532.

If it is determined that the trigger actuator is pressed, then the functionality further includes determining whether or not the trigger actuator is grounded, at 534.

If it is determined that the trigger actuator is not grounded, then functionality includes rendering the haptic effects to an individual on the trigger actuator, at 536.

If it is determined that the trigger actuator is grounded, then the functionality includes rendering the haptic effects on a second haptic actuator (e.g., a rumble pad) on or in a body (e.g., a body actuator) of the haptically-enabled device, at 538. According to an example embodiment, the rendering of the haptic effects on the second haptic actuator can occur when the trigger is contacted and not grounded.

Additionally, at 546, the functionality can include distributing the haptic effects between the trigger and body actuators to create a more immersive haptic effect that represents what is occurring in the game play, or reflects the design intent of the haptic author.

In an example embodiment, the distributing of the haptic effects between the trigger and body actuators can include gradually releasing the trigger actuator to an ungrounded state during the rendering of the haptic effects on the body actuator. The haptic effects can be primarily rendered on the trigger actuator when the trigger is in the ungrounded state.

In an alternative embodiment, the distributing of the haptic effects between the trigger actuator and the body actuator can include gradually grounding the trigger actuator during the rendering of the haptic effects on the trigger actuator. The haptic effects can be primarily rendered to the body actuator when the trigger actuator is grounded.

If, at 532, it is determined that the trigger actuator is not pressed, then the functionality further includes detecting contact with the trigger actuator, at 540.

If contact with the trigger actuator is detected, then the functionality includes rendering the haptic effects on the trigger actuator, at 542. The rendering the haptic effects on the trigger actuator can occur when the individual passively contacts the trigger actuator and is not actively contacting the trigger actuator.

Alternatively, if contact with the trigger actuator is not detected, then the functionality includes rendering the haptic effects on the body actuator, at 544.

Additionally, at 546, the functionality can include distributing the haptic effects between the trigger and body actuators to create a more immersive haptic effect.

In an example embodiment, the distributing of the haptic effects between the trigger actuator and the body actuator can occur when passive contact between the individual and the trigger actuator gradually ceases during the rendering of the haptic effects on the trigger actuator.

In an alternative example embodiment, the distributing of the haptic effects between the trigger actuator and the body actuator can occur when the individual passively contacts or actively contacts the trigger actuator during the rendering of the haptic effects on the body actuator.

As mentioned above, example embodiments are not limited to gaming, and therefore can be applied to any haptically-enabled device having a mechanical input (i) controllable by an individual, and (ii) being incapable of rendering the intended haptic effects in certain circumstances. For example, the mechanical input can be a deformation device that renders haptic effects by changing shape and that is prevented from changing shape when an individual exerts enough force to override or prevent the rendering of the haptic effects as intended.

Figure 6:
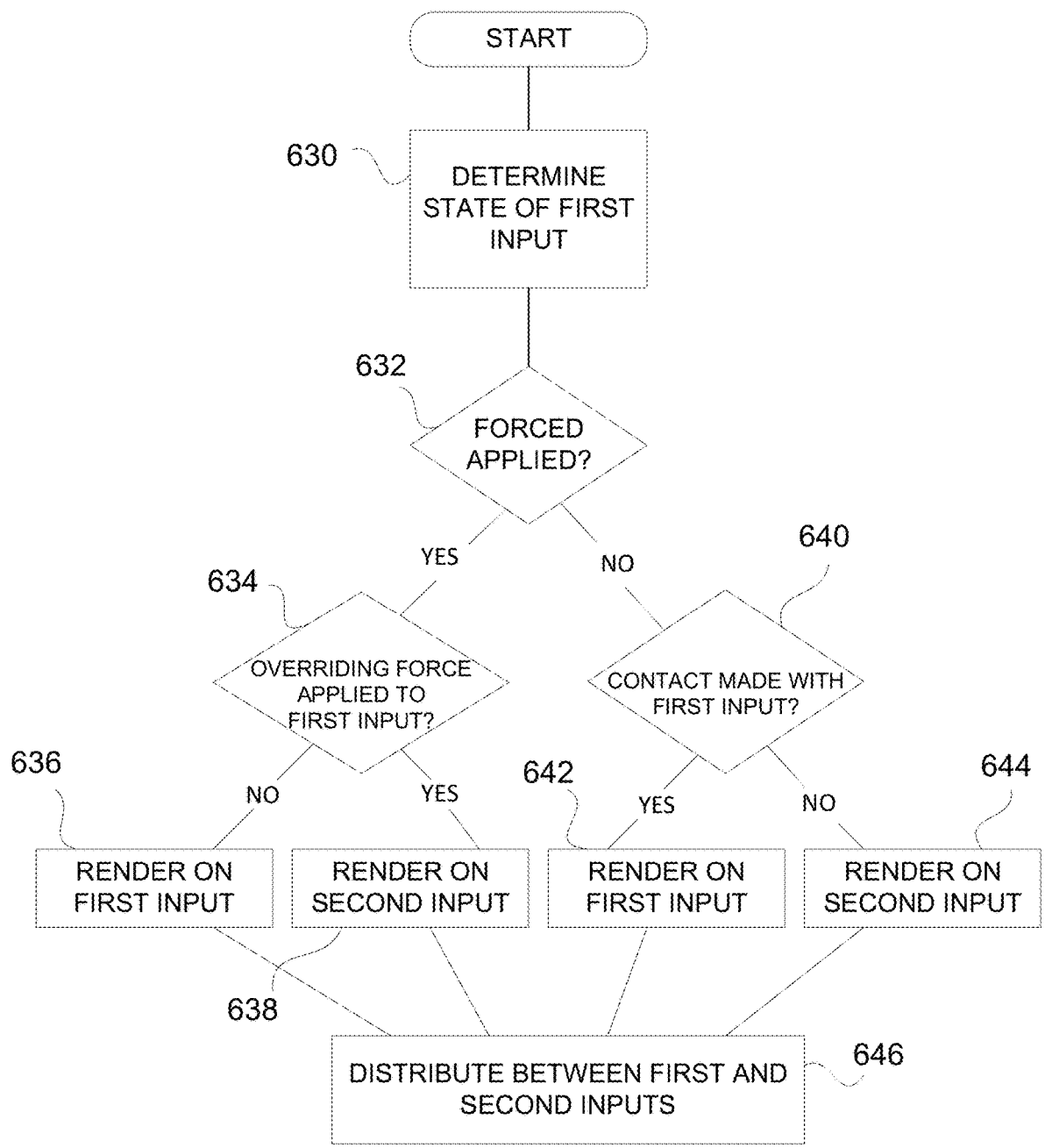

FIG. 6 is a flow chart of haptic rendering according to another example embodiment.

The functionality of FIG. 6 are similar to those shown in FIG. 5, except that FIG. 6 shows haptic rendering for a mechanical, kinesthetic actuator input.

Referring to FIG. 6, haptic rendering 600 for a haptically-enabled device according to an example embodiment includes determining the state of a first mechanical input of the haptically-enabled device during a haptic event, at 630. The state of the first mechanical input can be determined repeatedly, and often. For instance, the state of the first mechanical input can be determined in response to each input by an individual.

Depending on the determined state of the first mechanical input, the functionality further includes determining whether or not a force is applied to the first mechanical input, at 632.

If it is determined that a force is applied to the first mechanical input, then the functionality further includes determining whether or not the force is an overriding force, at 634.

If it is determined that an overriding force is not applied to the first mechanical input, then the functionality includes rendering the haptic effects to an individual by the first mechanical input, at 636.

If it is determined that an overriding force is applied to the first mechanical input, then the functionality includes rendering the haptic effects on a second mechanical input on or in a body of the haptically-enabled device, at 638. According to an example embodiment, the rendering of the haptic effects on the second mechanical input can occur when the first mechanical input is contacted and not overridden.

Additionally, at 646, the functionality can include distributing the haptic effects between the first and second mechanical inputs to create a more immersive haptic effect that represents what is occurring during the haptic event.

In an example embodiment, the distributing of the haptic effects between the first and second mechanical inputs can include gradually releasing the first mechanical input to a non-overriding state during the rendering of the haptic effects on the second mechanical input. The haptic effects can be primarily rendered on the first mechanical input when the first mechanical input in in the non-overriding state.

In an alternative embodiment, the distributing of the haptic effects between the first and second mechanical input can include gradually applying an overriding force to the first mechanical input during the rendering of the haptic effects on the first mechanical input. The haptic effects can be primarily rendered to the second mechanical input when the first mechanical input is overridden.

If, at point 632, it is determined that a force is not applied to the first mechanical input, then the functionality further includes detecting passive contact with the first mechanical input, at 640.

If passive contact with the first mechanical input is detected, then the functionality includes rendering the haptic effects on the first mechanical input, at 642. The rendering of the haptic effects on the first mechanical input can occur when the individual passively contacts the first mechanical input and is not actively contacting the first mechanical input.

Alternatively, if passive contact with the first mechanical input is not detected, then the functionality includes rendering the haptic effects on the second mechanical input, at 644.

Additionally, at 646, the functionality can include distributing the haptic effects between the first and second mechanical inputs to create a more immersive haptic effect.

In an example embodiment, the distributing of the haptic effects between the first and second mechanical inputs can occur as passive contact between the individual and the first mechanical input gradually ceases during the rendering of the haptic effects on the first mechanical input.

In an alternative example embodiment, the distributing of the haptic effects between the first and second mechanical inputs can occur when the individual passively contacts or actively contacts the first mechanical input during the rendering of the haptic effects on the second mechanical input.

Figure 7:
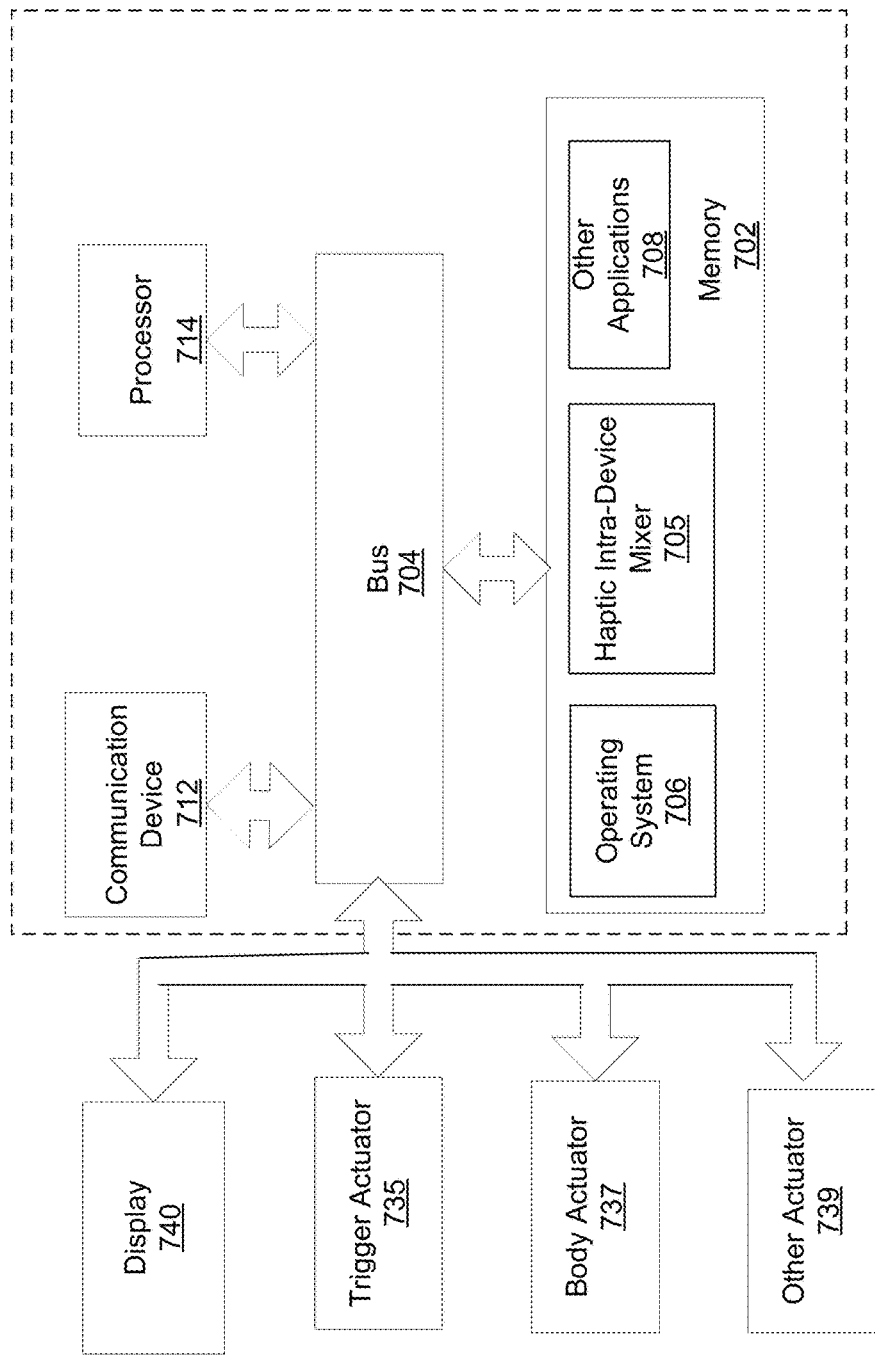

FIG. 7 is a block diagram of a system in a haptically-enabled device according to an example embodiment. Some or all of the components of FIG. 7 can also be used to implement any of the elements of FIGS. 1A, 1B, 1C, and 2. Some of the elements of FIG. 7 may be located in the haptically-enabled device itself (e.g., within a game controller) and some may be located remote from the haptically-enabled device (e.g., in a gaming console that is in communication, wired or wirelessly, with a game controller).

Referring to FIG. 7, a system 700 in a haptically-enabled device according to an example embodiment provides haptic functionality for the device.

Although shown as a single system, the functionality of system 700 can be implemented as a distributed system. System 700 includes a bus 704 or other communication mechanism for communicating information, and a processor 714 coupled to bus 704 for processing information. Processor 714 can be any type of general or specific purpose processor. System 700 further includes a memory 702 for storing information and instructions to be executed by processor 714. Memory 702 can be comprised of any combination of random access memory ("RAM"), read only memory ("ROM"), static storage such as a magnetic or optical disk, or any other type of computer-readable medium.

A computer-readable medium can be any available medium that can be accessed by processor 714, and can include both a volatile and nonvolatile medium, a removable and non-removable medium, a communication medium, and a storage medium. A communication medium can include computer readable instructions, data structures, program modules, or other data in a modulated data signal such as a carrier wave or other transport mechanism, and can include any other form of an information delivery medium known in the art. A storage medium can include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

According to an example embodiment, memory 702 stores software modules that provide functionality when executed by processor 714. The software modules include an operating system 706 that provides operating system functionality for system 700, as well as the rest of the haptically-enabled device. The software and/or firmware modules also include an intra-device mixer 705 that sub-operatively distributes the rendering of the haptic effects another actuator (e.g., a body actuator), in addition or alternative to the intended actuator, as described above. The intra-device mixer 705 is a part of a haptic system that provides haptic functionality. The software modules may further include other applications 708, such as, an audio-to-haptic conversion algorithm.

System 700 can further include a communication device 712 (e.g., a network interface card) that provides wireless network communication for infrared, radio, Wi-Fi, or cellular network communications. Alternatively, communication device 712 can provide a wired network connection (e.g., a cable/Ethernet/fiber-optic connection, or a modem).

Processor 714 is further coupled via bus 704 to a visual display 740 (e.g., a light-emitting display ("LED") or a liquid crystal display ("LCD")) for displaying a graphical representation or an individual interface to an end-individual. Visual display 740 can be a touch-sensitive input device (i.e., a touch screen) configured to send and receive signals from processor 714, and can be a multi-touch touch screen.

System 700 further includes actuators 735/737/739. Processor 714 can transmit a haptic signal associated with a haptic effect to actuators 735/737/739, which in turn outputs haptic effects.

According to example embodiments, haptic effects are rendered on multiple haptic output devices to optimize the haptic effects to reflect the game play, thereby providing a more immersive experience.

According to example embodiments, an enhanced haptic and immersive experience is provided even when the individual is not grasping the haptically-enabled device in an ideal manner.

The foregoing is illustrative of various example embodiments and is not to be construed as limiting thereof. Accordingly, all such modifications are intended to be included within the scope of the disclosure as defined in the claims.

What is claimed is:

1. A haptic rendering method for a haptically-enabled device, comprising:
   determining a state of a trigger associated with a first haptic actuator of the haptically-enabled device during a haptic event, the determining of the state of the trigger including detecting if the trigger is grounded; and
   rendering haptic effects on at least one of the first haptic actuator or a second haptic actuator based on the state of the trigger,
      the second haptic actuator being in a body of the haptically-enabled device, and
      the rendering of the haptic effects including rendering the haptic effects on the first haptic actuator when the trigger is contacted and not grounded, and the second haptic actuator when the trigger is grounded.

2. The haptic rendering method of claim 1, further comprising:
   distributing the haptic effects between the first haptic actuator and the second haptic actuator by gradually releasing the trigger to an ungrounded state during the rendering of the haptic effects on the second haptic actuator.

3. The haptic rendering method of claim 2, wherein the haptic effects are primarily rendered on the first haptic actuator when the trigger is in the ungrounded state.

4. The haptic rendering method of claim 1, further comprising:
   distributing the haptic effects between the first haptic actuator and the second haptic actuator by gradually grounding the trigger during the rendering of the haptic effects on the first haptic actuator.

5. The haptic rendering method of claim 4, wherein the haptic effects are primarily rendered to the second haptic actuator when the trigger is grounded.

6. A haptic rendering method for a haptically-enabled device, comprising:
   determining a state of a trigger associated with a first haptic actuator of the haptically-enabled device during a haptic event, the determining of the state of the trigger including detecting if the trigger is passively or actively contacted; and
   rendering haptic effects on at least one of the first haptic actuator or a second haptic actuator based on the state of the trigger, the second haptic actuator being in a body of the haptically-enabled device, and the rendering of the haptic effects including rendering the haptic effects on the first haptic actuator when the trigger is passively contacted and is not actively contacted, and rendering the haptic effects on the second haptic actuator when the trigger is not contacted.

7. The haptic rendering method of claim 6, further comprising:

distributing the haptic effects between the first haptic actuator and the second haptic actuator as passive contact with the trigger gradually ceases during the rendering of the haptic effects on the first haptic actuator.

8. The haptic rendering method of claim 6, further comprising:

distributing the haptic effects between the first haptic actuator and the second haptic actuator when the trigger is passively or actively contacted during the rendering of the haptic effects on the second haptic actuator.

9. A non-transitory computer-readable medium having instructions stored thereon that, when executed by a processor, cause the processor to:

determine a state of a trigger associated with a first haptic actuator of a haptically-enabled device during a haptic event, to determine the state of the trigger including detecting if the trigger is grounded; and render haptic effects on at least one of the first haptic actuator or a second haptic actuator based on the state of the trigger, the second haptic actuator being in a body of the haptically-enabled device, and the processor rendering the haptic effects on the first haptic actuator when the trigger is contacted and not grounded, and the second haptic actuator when the trigger is grounded.

10. The non-transitory computer-readable medium of claim 9, wherein the instructions further cause the processor to:

distribute the haptic effects between the first haptic actuator and the second haptic actuator by gradually releasing the trigger to an ungrounded state while rendering of the haptic effects on the second haptic actuator.

11. A non-transitory computer-readable medium having instructions stored thereon that, when executed by a processor, cause the processor to:

determine a state of a trigger associated with a first haptic actuator of a haptically-enabled device during a haptic event, to determine the state of the trigger including to detect if the trigger is passively or actively contacted; and render haptic effects on at least one of the first haptic actuator or a second haptic actuator based on the state of the trigger, the second haptic actuator being in a body of the haptically-enabled device, and to render the haptic effects including to render the haptic effects on the first haptic actuator when the trigger is passively contacted and is not actively contacted, and to render the haptic effects on the second haptic actuator when the trigger is not contacted.

12. A haptically-enabled device, comprising:

a trigger;

a first haptic actuator associated with the trigger; and a second haptic actuator being in a body of the haptically-enabled device, the first and second haptic actuators being configured to render haptic effects based on a state of the trigger during a haptic event, the first haptic actuator being configured to render the haptic effects when the trigger is contacted and not grounded, and the second haptic actuator being configured to render the haptic effects when the trigger is grounded.

13. The haptically-enabled device of claim 12, being configured to distribute the haptic effects between the first haptic actuator and the second haptic actuator by gradually releasing the trigger to an ungrounded state while the second haptic actuator is rendering the haptic effects.

14. The haptically-enabled device of claim 12 being configured to distribute the haptic effects between the first haptic actuator and the second haptic actuator when the trigger is gradually grounded while the first haptic actuator is rendering the haptic effects.

15. A haptically-enabled device, comprising:

a trigger;

a first haptic actuator associated with the trigger; and a second haptic actuator being in a body of the haptically-enabled device, the first and second haptic actuators being configured to render haptic effects based on a state of the trigger during a haptic event, the first haptic actuator being configured to render the haptic effects when the trigger is passively contacted and is not actively contacted, and the second haptic actuator being configured to render the haptic effects when the trigger is not contacted.

16. The haptically-enabled device of claim 15 being configured to distribute the haptic effects between the first haptic actuator and the second haptic actuator as the passive contact with the trigger gradually ceases while the first haptic actuator is rendering the haptic effects.

17. The haptically-enabled device of claim 15 being configured to distribute the haptic effects between the first haptic actuator and the second haptic actuator when the trigger is passively or actively contacted while the second haptic actuator is rendering the haptic effects.

18. The haptic rendering method of claim 1, wherein the rendering of the haptic effects includes altering, based on the state of the trigger, source content in a haptic drive signal for the haptic effects or a channel by which the haptic drive signal is transmitted using programming.

19. The non-transitory computer-readable medium of claim 9, wherein the rendering of the haptic effects includes altering, based on the state of the trigger, source content in a haptic drive signal for the haptic effects or a channel by which the haptic drive signal is transmitted using programming.

20. The non-transitory computer-readable medium of claim 11, wherein the rendering of the haptic effects includes altering, based on the state of the trigger, source content in a haptic drive signal for the haptic effects or a channel by which the haptic drive signal is transmitted using programming.

* * * * *